Jan. 15, 1935.  M. F. RICHARDSON  1,987,974
VALVE
Filed Feb. 18, 1933   5 Sheets-Sheet 1
FIG. I.
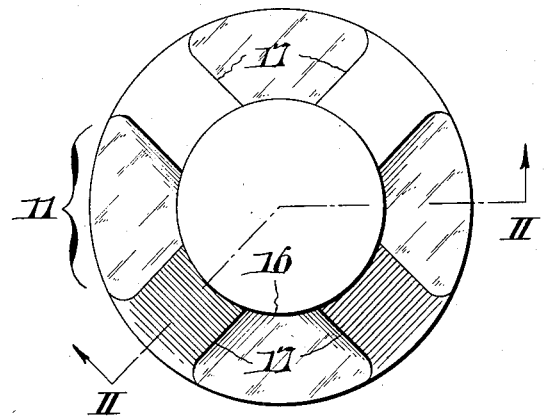
FIG. II.
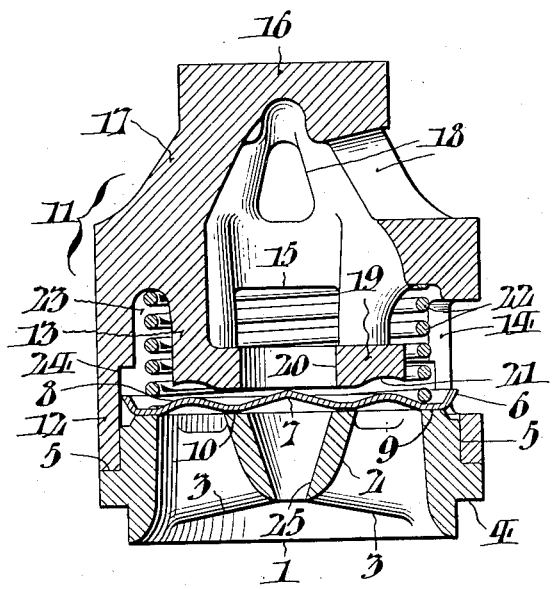
WITNESSES:
Thomas W. Kerr, Jr.
William Bell, Jr.
INVENTOR:
Maurice F. Richardson,
BY Falley Paul
ATTORNEYS.

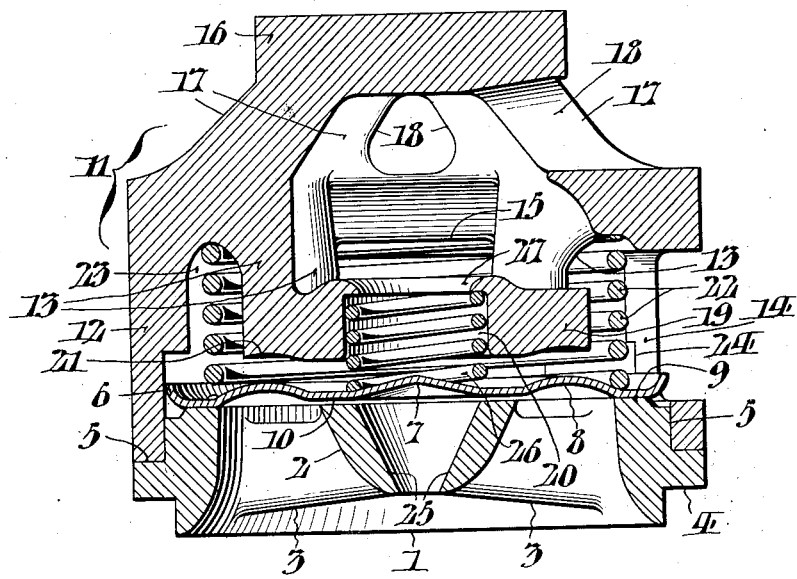
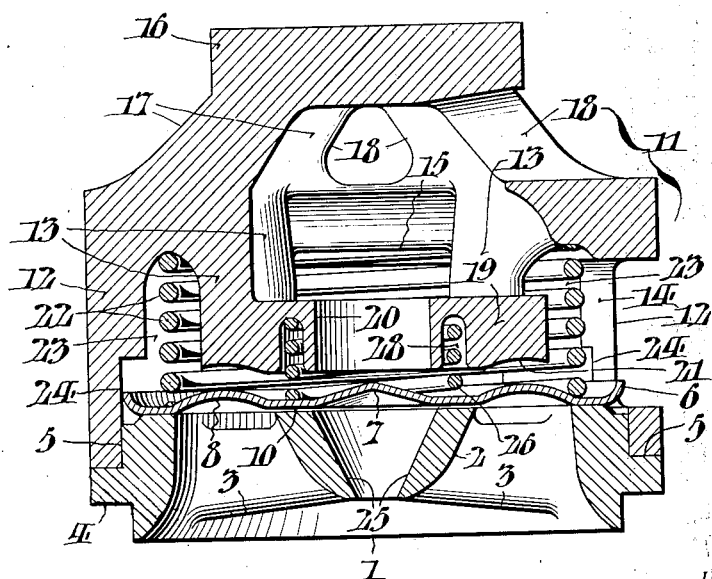

Jan. 15, 1935.   M. F. RICHARDSON   1,987,974
VALVE
Filed Feb. 18, 1933   5 Sheets-Sheet 3
FIG. V.
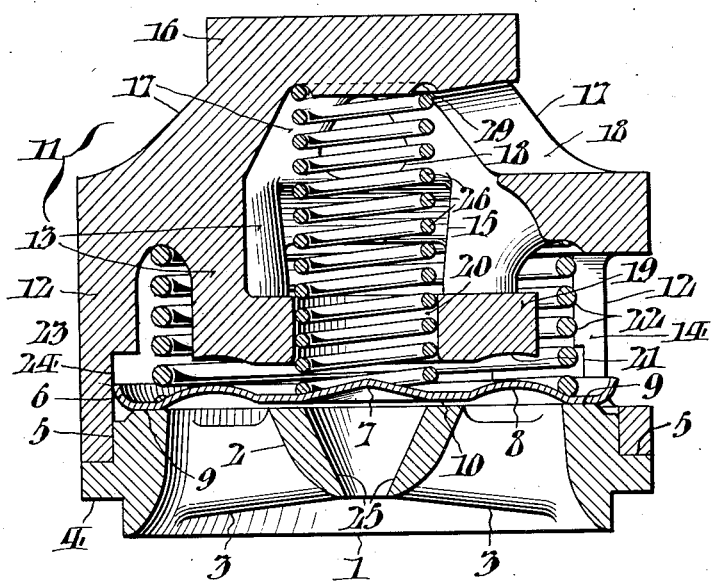
FIG. XI.
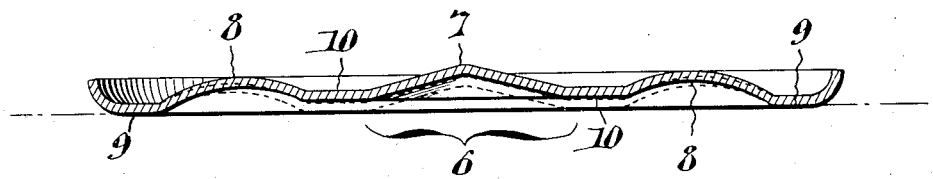
WITNESSES:
Thomas W. Kerr, Jr.
William Bell, Jr.
INVENTOR:
Maurice F. Richardson
BY Frally Paul
ATTORNEYS.

Jan. 15, 1935.　　　M. F. RICHARDSON　　　1,987,974
VALVE
Filed Feb. 18, 1933　　5 Sheets-Sheet 4
FIG. VI
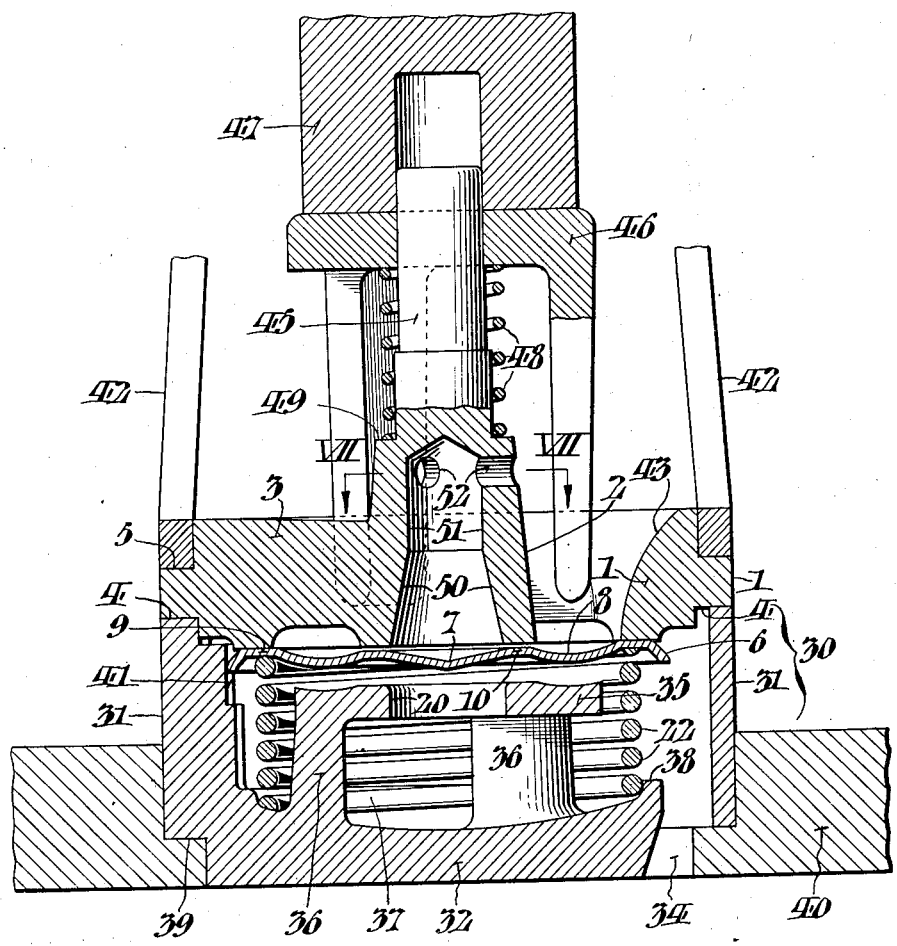
FIG. VII
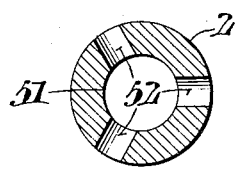
WITNESSES:
INVENTOR:
Maurice F. Richardson
BY
ATTORNEYS.

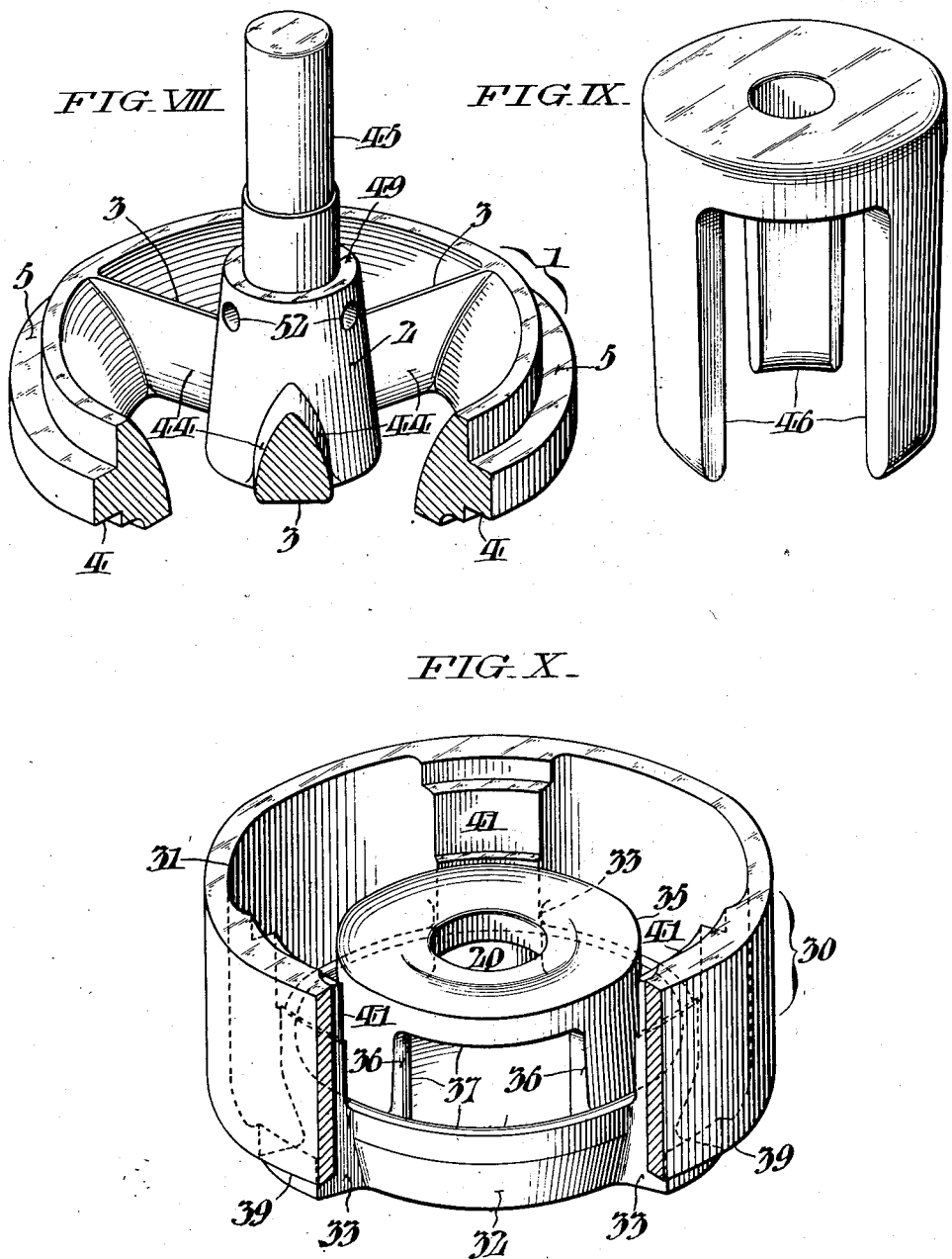

Patented Jan. 15, 1935

1,987,974

UNITED STATES PATENT OFFICE 1,987,974

VALVE

Maurice F. Richardson, Berwyn, Pa.

Application February 18, 1933, Serial No. 657,348

13 Claims. (Cl. 251—119)

This invention relates generally to valves of the disc type, while it refers more particularly to valves for use in liquid or gas compressors, and pumps capable of operating responsively to suction or pressure pulses in opening and closing the valve ports, such valves usually including a guard limiting "lift" of the disc element and guide means to prevent lateral displacement or "canting" of said element.

Valves of the type referred to, whether axially or peripherally guided, have a marked tendency to what is known in the art as "slow opening" due to overcoming the differential, or pressure hold, set up between the valve and seat contacting area relative to the non-contacting area.

In a prior application for patent filed by me, November 9, 1932, under Serial Number 641,817, I have set forth a means designed to overcome such "slow opening" tendency by provision of a suitably proportioned and contoured passage axially through the valve seating member which is adapted to entrain and build up a sufficient volumetric pressure to equalize the differential.

The present invention has reference primarily to certain improvements in valves of the type described in the above referred to application, and comprehends structural refinements, as well as varied combinations of the correlated elements, whereby the efficiency of such valves is greatly enhanced and "slow opening" positively eliminated.

With the foregoing in view the instant invention consists fundamentally in forming the disc valve with a slightly-coned central portion in axial registration with the valve seat central-passage, and in positioning the valve cushioning spring or springs so that said valve disc is positively maintained in proper balance under all normal service conditions.

In the accompanying drawings, like reference characters are applied to all corresponding parts in the several views, excepting where structural differences exist, in order to avoid repetitive descriptive matter.

Fig. I is a top plan view of a pressure valve unit embodying the present invention.

Fig. II is a staggered vertical section, taken as indicated by the arrows II—II in Fig. I.

Fig. III is a like vertical section of a modified form of the invention.

Fig. IV is a similar sectional view of another modification.

Fig. V is a corresponding section of a still further modified form of the invention.

Fig. VI is a staggered vertical section, along a plane, such as indicated in Fig. I, through a valve unit of the suction type, and embodying the instant improvements.

Fig. VII is a section taken as indicated by the arrows VII—VII of Fig. VI.

Fig. VIII is a perspective view, with a portion broken out to better disclose the sectional formation, of the seating component of the valve shown by Fig. VI.

Fig. IX is a perspective view of a tripod component.

Fig. X is a broken perspective view of the apertured valve-body member and guard or stop means; and, Fig. XI is a diametric section of the improved valve disc common to all the illustrated forms of my invention, but drawn to a larger scale in order to better emphasize a constructive feature hereinafter fully explained.

Referring more in detail firstly to Figs. I–VIII of the drawings, the numeral 1 designates a ported valve seat member embodying a central boss 2 and radial webs 3 defining ports or sectoral flow passages therethrough. This seat member 1 is conveniently, although not essentially, provided with a circumferential stop rim 4, serving to limit forced-fit engagement in the usual partition or pump chest deck, not shown, or elsewhere as later on set forth; and above said rim is a marginal shoulder 5, for a purpose later on explained.

The valve disc 6, it is to be noted, is imperforate and struck, or otherwise formed, from sheet metal to provide a slightly-coned central portion 7, with an annular arched ridge 8 intermediate outer and inner (or normal and abnormal) concentric seating surfaces or areas 9, 10, respectively. It is also to be particularly observed that the inner seating surface 10 is offset, relative to the outerseating surface 9, as best shown in Fig. XI, for reasons later on set forth. In practice this offsetting varies, in accordance with the gauge and diameter of the valve disc 6, from two to five-thousandths of an inch and is designed to accommodate flexure of said valve disc, under certain operating conditions, as conventionally indicated by the dotted lines in Fig. XI.

To limit movement or "lift" of the valve disc 6, I make use of a "cage-like" device comprehensively designated 11, Figs. I–V, said device embodying outer and inner concentric body walls 12, 13, respectively, having flow openings 14, 15 therethrough. This device 11 also comprises a substantial concentric head 16, spaced from the body walls 12, 13 by webs 17, to define upwardly-convergent outlets 18 serviceable to induce, in part, turbulent-flow through the valve laterally, with incidental increased rapidity of discharge. Particular attention is directed to the inner body wall 13 which embodies an annular guard or stop means 19, having an orifice 20 therethrough to accommodate "lift" of the valve disc coned central-portion 7, and for a purpose later on explained. The outer face 21 of the stop means 19 is, in part, appropriately finished-off to a cross-sectional curvature corresponding with that of the convexed face of the valve disc annular arched ridge 8, so that, under rapid action, said disc is prevented from hammering-damage or deformation; while it is also pointed out that the diameter of the orifice 20 is of a dimension to ensure similar safeguards with reference to the coned central-portion 7; all of which will be easily understood from Figs. I–VI, without further explanation.

In the form of my invention shown in Fig. I, a spring 22, in compression, is interposed in the cavity 23 intermediate the outer and inner walls 12, 13 of the device 11 and valve disc 6, so as to exert its full force on said disc, substantially over the outer seating surface 9; while it will be seen that the peripheral edge of the valve disc 6 is vertically guided by a counterbore 24 in the outer wall 12. By proper determination as to the gauge and pressure of the spring 22, in addition to its location substantially over the outer seating surface 9, and by offsetting the inner seating surface 10 of the valve disc 6 as set forth, I provide a disc valve which, under ordinary actuation, is free of any tendency to "slow opening" by reduction of the normal seating area. On the other hand, should pressure on the valve disc 6 increase, said disc is flexed, in an axial direction through provision of the inner flow openings 15 and stop means orifice 20, to effect contact of the inner seating surface 10 with the central boss 2 until the differential is balanced, whereupon normal conditions are automatically restored by reverse flexure of the valve disc 6.

It may be here remarked that the orifice 20 in conjunction with the disc coned portion 7 effects a radial outwardly-even and somewhat streamline distribution of the pressure tending to flex the valve disc 6; whereas said coned portion 7 by coaction with an inverted frusto-conical axial passage 25, in the seat boss 2, somewhat similarly functions to maintain the valve disc 6 definitely central, as well as in horizontal balance at all times, whereby "canting" of said disc relative to the seat member 1 is eliminated.

In some cases, and more especially with respect to valves of comparatively large diameter, and in order to better ensure proper cushioning of the valve disc inner seating surface 10, and to prevent undue flexure of the disc 6, I make use of an auxiliary spring 26, for coaction with said seating surface. As shown in Fig. III, this spring 26 is housed in the stop means orifice 20, intermediate the upper face of the seating surface 10 and an overhanging lip 27, at the inner end of said orifice.

In the form of my invention shown in Fig. IV, the auxiliary spring 26 is housed in an annular groove 28 in the stop means 19, exterior to and concentric with the orifice 20; while in the embodiment shown by Fig. V, the auxiliary spring 26 is extended upwards through the orifice 20, for abutment against the underside of the cage-like device head 16, which is conveniently grooved at 29, for centralizing said spring. In all other respects the forms of my invention shown by Figs. III, IV and V, substantially conform with the structure and descriptive matter relating to Figs. I and II; and, hence further explanation thereof is deemed unnecessary.

Referring now to Figs. VI–X, the numeral 30 comprehensively designates a valve body member, and 1 indicates the ported seat-member as before similarly indicated. The body-member 30, as best understood from Figs. VI and X, is a unitary structure comprising a cylindrical wall portion 31, a concentric base 32 separated therefrom by radial webs 33 to define arcuate flow-passages 34, and an axial valve stop means 35, spaced relative to the base 32 by integral portions or connecting members 36. It is to be noted that the members 36 are in the same radial plane as the webs 33 so as to offer a minimum of obstruction to free-flow, and that they define openings 37, in registration with the arcuate flow-passages 34; while the stop means 35 has an axial orifice 20, for the purpose hereinbefore pointed out. In addition it will be seen that the inner surface of the base is dished to define a circumferential rim 38. The body member 30 is conveniently, although not essentially, provided with a circumferential stop rim 39, serving to limit forced-fit engagement in the partition or pump chest deck 40, or other support, as will be readily understood by those acquainted with the art.

The valve disc 6 is held in place by a spring 22 as before, under compression, intermediate said disc and the dished base 32, while its perimetric lip 6 is guided by boring the radial webs 33, as at 41, in an obvious manner.

Referring now to the seat-member 1, the same somewhat corresponds with that of Figs. I–V in that it embodies an annular section with a central boss 2 and connecting radial arms 3, said annular section being formed with a stop rim 4 for forced-fit engagement in the open end of the body member cylindrical portion 31, as readily understood from Fig. VI. Above the stop rim 4, the seat member 1 is provided with a marginal shoulder 5, for engagement by a suitable hold-down means, conventionally indicated at 42 and needing no further description herein. It is to be particularly remarked, in connection with all the showings of my invention, that the inner surface 43 of the annular section is flared, while the side surfaces of the arms 3 are reversely convexed at 44 to better ensure stream-line flow through the valve.

The central boss 2, of the seat member 1, in this form of the invention, is of somewhat frusto-conical formation, with an axial stem extension 45 for reception of a tripod device 46, said device being normally held, in the position shown by Fig. VI, in abutment with a suitable actuator means 47, through the medium of a spring 48, intermediate a shoulder 49 of the boss 2 and the opposing face of the tripod device 46.

In order to accommodate the pressure-differential hereinbefore mentioned, I provide the seat member boss 2 with an inwardly-flaring bore 50 connecting into a cylindrical continuation 51 having radial-outlets 52, above the plane of the annular section and arms 3. This boring 50, 51 serves to axially entrain a volume of the medium passing through the valve and to build up a sufficient volumetric pressure to equalize the differential as hereinbefore set forth.

From the foregoing, the merits and advantages of my invention are deemed fully apparent to those skilled in the art, while it will be obvious the inventive ideas set forth may be varied without departure from the scope of said invention as defined by the following claims.

Having thus described my invention, I claim:

1. In a valve of the character described the combination of a cylindrical-member having one end open and the other provided with a concentric stop means having an axial passage and spaced therefrom by connecting webs to define flow-passages; a ported seat-member engaged with the open end of the cylindrical-member having a marginal shoulder to accommodate suitable securing means, said seat-member having its flow-passage surfaces outwardly-flared; and a spring-influenced centrally-coned imperforate valve disc intermediate the seat-member and stop means, and said valve disc having annular seating surfaces one of which is offset relative to the other to accommodate flexure of said disc in counterbalancing differential pressures.

2. In a valve the combination of a ported seat member having a constricted axial passage; a discous valve element embodying a coned central portion and concentric normal and abnormal seating areas, one of said areas being offset relative to the other; said constricted passage and coned valve portion being adapted to entrain a volume of compressible medium effective to maintain the valve element axially in balance; a cage-like device securely engaged over the ported seat member and embodying an axially apertured stop means to limit lift of the valve element; and means in compression in the cage-like device normally retaining the valve element seated while aiding flexure of said element to counterbalance differential pressures set up between the normal and abnormal valve seating areas.

3. In a valve the combination of a ported seat member having an inverted frusto-conical axial passage; an imperforate discous valve element embodying a slightly coned central portion and concentric normal and abnormal seating areas separated by an annular arched ridge, the inner of said areas being minutely offset relative to the outer area; said frusto-conical passage and coned valve portion being adapted to entrain a volume of compressible medium effective to maintain the valve element axially in balance; a cage-like device with inner and outer apertured walls securely engaged over the ported seat member, said inner wall embodying an axially apertured stop-means to limit lift of the valve element; and a spring in compression intermediate the apertured walls coacting with the valve element outer seating area to normally retain said element seated while accommodating flexure of said element to counterbalance differential pressures set up between the normal and abnormal valve seating areas.

4. The combination of claim 3 where the lower face of the axially apertured stop means is shaped to, in part, conform with the curvature of the valve annular arched ridge to prevent hammering and distortion of the latter.

5. The combination of claim 3 wherein the cage-like device is provided with a head spaced above the inner and outer apertured walls by webs to define upwardly convergent flow orifices.

6. In a valve the combination of a ported seat member having an inverted frusto-conical axial passage; an imperforate discous valve element embodying a slightly coned central portion and concentric outer and inner seating areas separated by an annular arched ridge, the inner of said areas being minutely offset relative to the outer area; said frusto-conical passage and coned valve portion being adapted to entrain a volume of compressible medium effective to maintain the valve element axially in balance; a cage-like device with inner and outer apertured walls securely engaged over the ported seat member, said inner wall embodying an axially apertured stop-means to limit lift of the valve element; an outer spring in compression intermediate the cage-like device apertured walls coacting with the disc valve outer seating area, and an auxiliary spring similarly coacting with the disc valve inner seating area, the former of said springs normally retaining the valve element seated; and both springs jointly accommodating flexure of said valve element to counter-balance differential pressures set up between the outer and inner seating areas.

7. The combination of claim 6 wherein the auxiliary spring is restrained between the discous valve element and a lip inwardly at the top of the guard axial aperture.

8. The combination of claim 6 wherein the auxiliary spring is housed in an annular groove exterior to and coaxial with the guard axial aperture.

9. The combination of claim 6 wherein the auxiliary spring extends upwardly through the guard axial aperture for engagement below the cage-like device head.

10. In a valve of the character described the combination of a body member including a cylindrical portion having one end open and the other provided with a concentric base spaced therefrom by longitudinal connecting webs to define arcuate flow-passages, integrally formed stop means spaced from the base axially within the body-member; a ported seat-member engaged in the open end of the body member and having a marginal shoulder to accommodate suitable hold-down means, said seat-member embodying a central boss and radial arms defining sectoral ports having their curved surfaces outwardly-flared and the inside-surfaces of said arms reversely convexed; and a spring-influenced valve disc intermediate the seat-member and stop means, said valve disc being circumferentially guided by inwardly reduced portions of the longitudinal connecting webs aforesaid.

11. The combination of claim 10 wherein the seat-member central boss is formed with an axial stem and is also provided with an inwardly-tapering bore having radial-outlets beyond the outer plane of said seat member.

12. As an article of manufacture a body-member for valves including a cylindrical portion having one end open and the other provided with a concentric base spaced therefrom by radial webs to define arcuate flow-passages, said base having its inner surface dished to provide a circumferential rim and also embodying an axially spaced stop means the spacing portions whereof are in the same planes as the respectively associated radial webs.

13. As an article of manufacture a seat-member for valves embodying an annular-section with a central boss and connecting arms, said seat member having its inner annular surface outwardly-flared and the side surfaces of the arms reversely-convexed, and the central boss being provided with an axial stem at one end and also having an inwardly-tapering bore with radial outlets beyond the outer confines of the annular-section and connecting arms.

MAURICE F. RICHARDSON.